(12) United States Patent  
Chang

(10) Patent No.: US 8,745,919 B2
(45) Date of Patent: Jun. 10, 2014

(54) PHOTOVOLTAIC GREENHOUSE STRUCTURE

(76) Inventor: Yeeshyi Chang, Taipei (TW)

(*) Notice: Subject to any disclaimer, the term of this patent is extended or adjusted under 35 U.S.C. 154(b) by 131 days.

(21) Appl. No.: 13/416,164

(22) Filed: Mar. 9, 2012

(65) Prior Publication Data

US 2013/0232868 A1    Sep. 12, 2013

(51) Int. Cl.
*A01G 9/00*    (2006.01)

(52) U.S. Cl.
USPC ............................................................. 47/17

(58) Field of Classification Search
USPC ............................................................. 47/17
See application file for complete search history.

(56) References Cited

U.S. PATENT DOCUMENTS

| | | | |
|---|---|---|---|
| 4,249,340 A * | 2/1981 | Maes, Jr. ........................... | 47/17 |
| 4,663,495 A | 5/1987 | Berman et al. | |
| 2010/0220389 A1 | 9/2010 | Villuendas Yuste et al. | |
| 2010/0236164 A1 | 9/2010 | Chuang et al. | |
| 2011/0153053 A1 | 6/2011 | Kim et al. | |

FOREIGN PATENT DOCUMENTS

| | | |
|---|---|---|
| EP | 2230695 A2 | 9/2010 |
| EP | 2272325 A1 | 1/2011 |
| EP | 2294910 A1 | 3/2011 |

* cited by examiner

*Primary Examiner* — Monica Williams
(74) *Attorney, Agent, or Firm* — Pierce Atwood LLP; Kevin M. Farrell

(57) ABSTRACT

The disclosure describes a photovoltaic greenhouse that has a frame structure including a plurality of upstanding walls and a roof structure supported by the frame structure. The greenhouse also includes a plurality of photovoltaic cells installed in the roof structure or walls. The photovoltaic cells convert solar energy into electricity by absorbing a predefined wavelength band of electromagnetic energy in the solar energy. The photovoltaic cells have different predefined infrared transmissivity properties to transmit infrared energy through each photovoltaic cell from outside the greenhouse to inside the greenhouse based on the respective photovoltaic cell's predefined infrared transmissivity property. The photovoltaic cells are distributed in the roof structure or walls in a pattern to heat ground locations within the frame structure to different temperatures in response to the infrared energy transmitted through the photovoltaic cells.

16 Claims, 7 Drawing Sheets

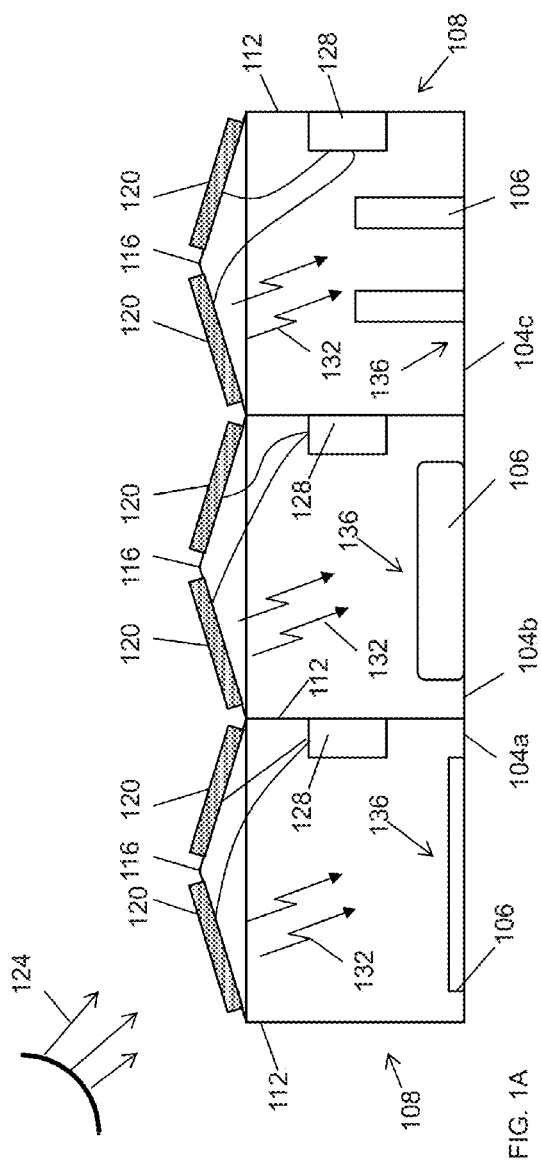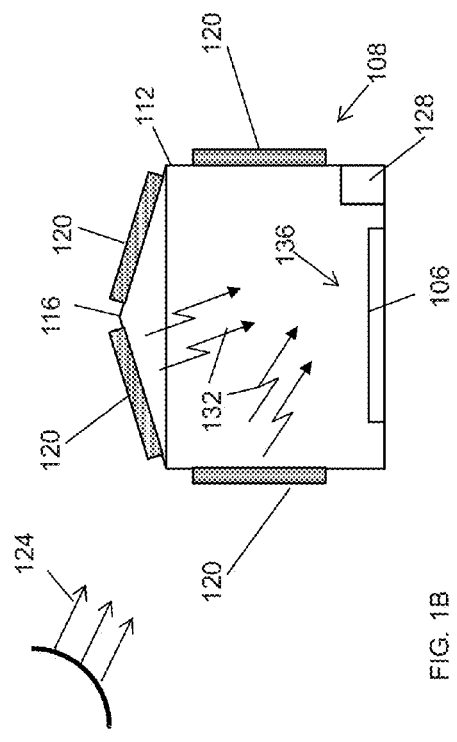

PHOTOVOLTAIC GREENHOUSE STRUCTURE

BACKGROUND

The development of modern agriculture has increased the demand for energy efficiency. Existing agricultural production systems utilize solar energy systems that use photovoltaic cells in inefficient ways. A need therefore exists for improved photovoltaic greenhouse structures.

SUMMARY

The disclosure describes a photovoltaic greenhouse that has a frame structure that includes a plurality of upstanding walls and a roof structure supported by the frame structure. The greenhouse also includes a plurality of photovoltaic cells installed in the roof structure or walls. The photovoltaic cells convert solar energy into electricity by absorbing a predefined wavelength band of electromagnetic energy in the solar energy. The photovoltaic cells have different predefined infrared transmissivity properties to transmit infrared energy through each photovoltaic cell from outside the greenhouse to inside the greenhouse based on the respective photovoltaic cell's predefined infrared transmissivity property. The photovoltaic cells are distributed in the roof structure or walls in a pattern to heat ground locations within the frame structure to different temperatures in response to the infrared energy transmitted through the photovoltaic cells.

In some embodiments, the pattern to heat ground locations within the frame structure to different temperatures in response to the infrared energy transmitted through the photovoltaic cells induces a convective air flow in the greenhouse. In some embodiments, the induced convective air flow distributes carbon dioxide, water vapor, oxygen, pollen, and heated air in the greenhouse. In some embodiments, the photovoltaic cells are distributed such that a photovoltaic cell having a relatively high infrared transmissivity property is surrounded by a plurality of photovoltaic cells each having relatively low infrared transmissivity properties.

In some embodiments, the photovoltaic cells are arranged in a grid pattern in the roof structure, and the ground locations are subjected to amounts of infrared energy passing through the photovoltaic cells based on the infrared transmissivity properties of the photovoltaic cells. In some embodiments, the photovoltaic cells have predefined transmissivity properties that allow prespecified wavelengths of electromagnetic energy to pass through the photovoltaic cells to promote growth of living organisms in the greenhouse.

In some embodiments, the photovoltaic cells have predefined transmissivity properties that allow prespecified wavelengths of electromagnetic energy to pass through the photovoltaic cells to promote photosynthesis in living organisms in the greenhouse. In some embodiments, the greenhouse is a multi-span structure, and each span of the greenhouse has photovoltaic cells having different predefined infrared transmissivity properties. In some embodiments, the photovoltaic cells are thin-film photovoltaic cells.

Another embodiment includes a method for generating an air flow in a photovoltaic greenhouse, wherein the greenhouse includes a frame structure including a plurality of upstanding walls, a roof structure supported by the frame structure, and a plurality of photovoltaic cells installed in the roof structure or walls, wherein the photovoltaic cells convert solar energy into electricity by absorbing a predefined wavelength band of electromagnetic energy in the solar energy. The method includes receiving solar energy at the photovoltaic cells. The method includes filtering the solar energy with the photovoltaic cells based on predefined infrared transmissivity properties of the photovoltaic cells, wherein the photovoltaic cells have different predefined infrared transmissivity properties. The method also includes transmitting infrared energy through each photovoltaic cell from outside the greenhouse to inside the greenhouse based on the respective photovoltaic cell's predefined infrared transmissivity property. The method also includes heating ground locations within the frame structure to different temperatures in response to the infrared energy transmitted through the photovoltaic cells.

In some embodiments, the method includes distributing the photovoltaic cells of different predefined infrared transmissivity in the roof structure or walls in a pattern to heat the ground locations within the frame structure to different temperatures. In some embodiments, the method includes inducing a convective air flow in the greenhouse by distributing the photovoltaic cells of different predefined infrared transmissivity in the roof structure or walls in a predefined pattern.

In some embodiments, the induced convective air flow distributes carbon dioxide, water vapor, oxygen and heated air in the greenhouse. In some embodiments, a photovoltaic cell having a relatively high infrared transmissivity property is surrounded by a plurality of photovoltaic cells each having relatively low infrared transmissivity properties. In some embodiments, the photovoltaic cells are arranged in a grid pattern in the roof structure, and the ground locations are subjected to amounts of infrared energy passing through the photovoltaic cells based on the infrared transmissivity properties of the photovoltaic cells.

In some embodiments, the photovoltaic cells have predefined transmissivity properties that allow prespecified wavelengths of electromagnetic energy to pass through the photovoltaic cells to promote growth of living organisms in the greenhouse. In some embodiments, the photovoltaic cells have predefined transmissivity properties that allow prespecified wavelengths of electromagnetic energy to pass through the photovoltaic cells to promote photosynthesis in living organisms in the greenhouse. In some embodiments, the method includes orienting the greenhouse such that a roof line of the greenhouse is oriented in a global north-south position.

The solar energy systems and greenhouse structures described herein (hereinafter "technology") can provide one or more of the following advantages. One advantage of the technology is that convective air flows can be efficiently generated in greenhouse structures through the use of photovoltaic cells having different, but complementary infrared transmissivity properties. Another advantage of the technology is that convective air flows that are generated aid in the distribution of carbon dioxide, water vapor, oxygen and heated air in greenhouse structures. By distributing these substances, it is possible to improve the cultivation of living organisms within the greenhouse structure.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

FIG. 1A is a schematic illustration of a multi-span photovoltaic greenhouse structure, according to an illustrative embodiment.

FIG. 1B is a schematic illustration of a photovoltaic greenhouse, according to an illustrative embodiment.

DETAILED DESCRIPTION OF ILLUSTRATIVE EMBODIMENTS

Figure 1C:
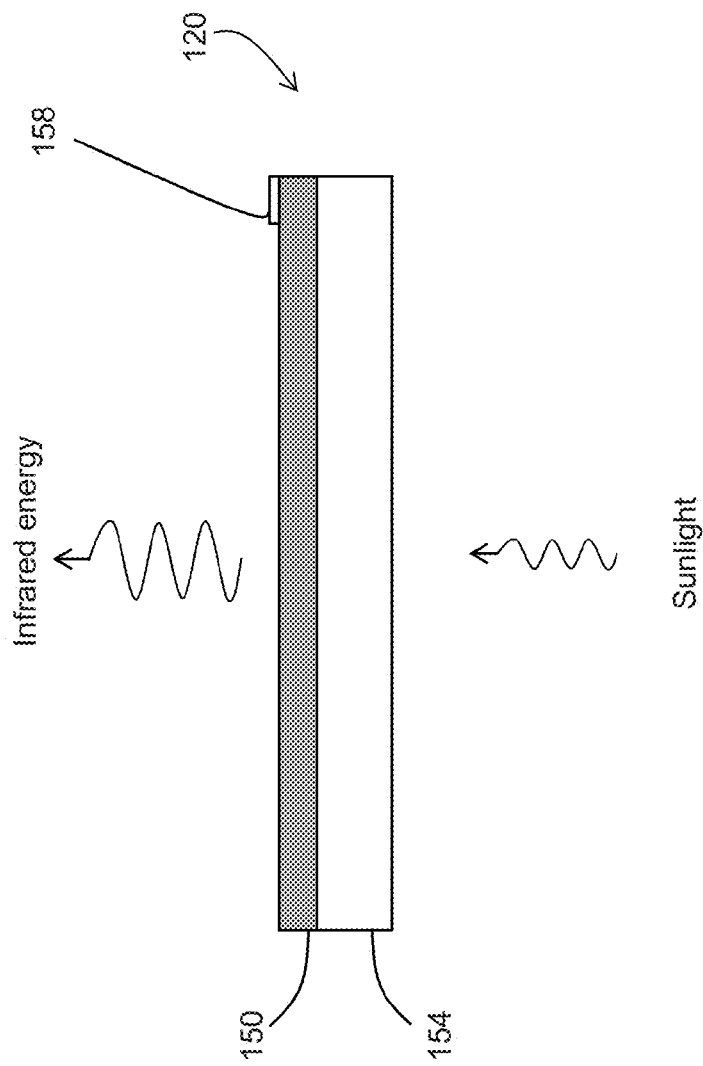
FIG. 1C is a schematic illustration of a photovoltaic cell, according to an illustrative embodiment.

FIG. 1A is a schematic illustration of a multi-span photovoltaic greenhouse structure 100, according to an illustrative embodiment. The multi-span structure 100 includes three greenhouse structures 104a, 104b, and 104c (generally 104) that are used to grow or otherwise cultivate living organisms 106 within the greenhouses 104. The living organisms can be for example, plants, trees, aquatic life, or livestock. Each greenhouse 104 includes a frame structure 108 that includes a plurality of walls 112. Each greenhouse 104 also includes a roof structure 116 supported by the frame structure 108.

The greenhouses 104 also include a plurality of photovoltaic cells 120 installed in the roof structure 116. The photovoltaic cells 120 convert solar energy 124 into electricity by absorbing electromagnetic energy in the solar energy. In some embodiments, the photovoltaic cells are configured to generate electricity from electromagnetic energy in the ultraviolet to green visible light wavelengths (e.g., about 200 to about 600 nanometers). The cells 120 produce a flow of electrons as a consequence of absorbing electromagnetic energy. Photovoltaic materials used in the cells include, for example, monocrystalline silicon, polycrystalline silicon, amorphous silicon, and cadmium telluride. In some embodiments, the photovoltaic cells 120 used are thin-film photovoltaic cells (see, for example, the photovoltaic cell of FIG. 1C). Thin film photovoltaic cells are made by depositing one or more layers 150 of photovoltaic material on a substrate 154 (e.g., a glass substrate). The photovoltaic cell 120 also allows some infrared energy to be transmitted through the cell as described below. The thickness of the layers can range from a several nanometers to tens of micrometers. The photovoltaic cell 120 also includes electrical contacts 158 for outputting the electricity generated by the cells 120.

The electricity generated by the photovoltaic cells 120 is provided to a solar energy inverter system 128. The inverter 128 is electrically connected to the electrical contacts 158 of the cells 120. Referring to FIG. 1A, the inverter 128 is an electrical system that receives direct-current (DC) power generated by the photovoltaic cells 120 and converts the DC power into alternating-current (AC) power. The AC power can then be used by the greenhouse to power equipment. In some embodiments, the AC power is stored for use by the greenhouse at a later time. In some embodiments, the inverter is connected to a local power company power grid. The AC power is provided to the grid and is sold to the local power company.

In this embodiment, the photovoltaic cells 120 also transmit some of the received electromagnetic energy 124 through the cells 120. In this embodiment, the photovoltaic cells 120 have infrared transmissivity properties that allow some of the infrared energy 132 to be transmitted from outside the greenhouse 104 through the photovoltaic cells 120 to the inside of the greenhouse 104. Infrared energy is electromagnetic radiation with a wavelength longer than that of visible light, typically in the range of 0.74 μm to about 300 μm. The predefined infrared transmissivity properties of a photovoltaic cell 120 specify how much infrared energy will be transmitted through the cell 120. The infrared energy 132 that passes through the photovoltaic cells 120 heats ground locations 136 within the frame structure 112. The temperature to which the ground locations 136 are heated will depend on the amount of infrared energy in the received electromagnetic energy 124 and the transmissivity properties of the photovoltaic cells 120. The infrared transmissivity properties can be tailored by varying the types of materials used in the construction of the cells 120. For example, in some embodiments, metals or metal oxides are applied to one of the layers of a photovoltaic cell 120 to alter the infrared transmissivity properties of the cell 120. Typical metal oxides used include vanadium oxide, molybdenum oxide, indium-tin oxide, and zinc oxide. The metal oxides are typically applied in layers that are between 1 nanometer to about 900 nanometers in thickness. The metal/metal oxides reflect the infrared energy. Thinner layers of metal/metal oxide reflect a small percentage of the infrared energy. Thicker layers of metal/metal oxide reflect a larger percentage of the infrared energy. The thickness selected for the layers of metal/metal oxide is determined based on how much infrared energy one wants to reflect versus allow through and into the greenhouse.

FIG. 1B is a schematic illustration of a single photovoltaic greenhouse 104, according to another illustrative embodiment. In this embodiment, the greenhouse 104 also includes a frame structure 108 that include a plurality of walls 112 and a roof structure 116 supported by the frame structure 108. The greenhouse 104 includes a plurality of photovoltaic cells 120. However, in this embodiment, the photovoltaic cells are installed in the roof structure 116 and the walls 112 of the greenhouse 104. In some embodiments, the photovoltaic cells are only installed in the walls of the greenhouse.

Figure 2:
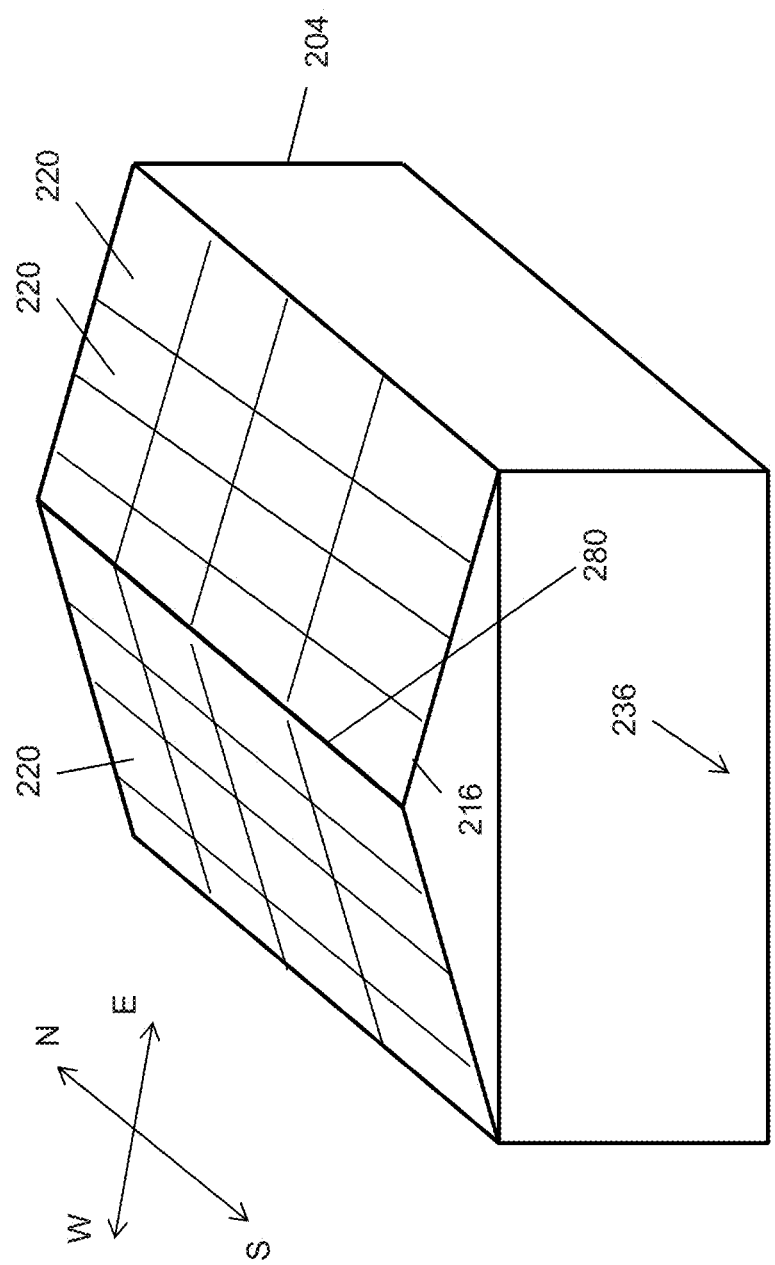
FIG. 2 is a schematic illustration of a photovoltaic greenhouse with a plurality of photovoltaic cells installed in the roof structure, according to an illustrative embodiment.

Alternative layouts and configurations of the photovoltaic cells can be used in alternative embodiments. FIG. 2 is a schematic illustration of a photovoltaic greenhouse 204 with a plurality of photovoltaic cells 220 installed in the roof structure 216 of the greenhouse 204, according to an illustrative embodiment. In this embodiment, the roof structure 216 is a gable roof structure. The photovoltaic cells 220 are arranged in a grid pattern (a 4×4 pattern) in each half of the gable roof of the roof structure 216. The photovoltaic cells 220 can be arranged in different regular or irregular patterns in alternative embodiments. In some embodiments, the photovoltaic cells 220 can have a different shape (for example, hexagonal or square) than the rectangular shape depicted. By having a plurality of photovoltaic cells 220 in the roof structure 216, it is possible to use cells 220 with different infrared transmissivity properties to heat the ground locations 236 within and below the photovoltaic cells 220 to different temperatures. In some embodiments, some of the cells in the roof structure are transparent panels, rather than photovoltaic cells. The transparent panels do not convert solar energy into electricity and also do not necessarily affect the transmission of infrared energy through the panels to the inside of the greenhouse structure.

In addition, in this embodiment, the greenhouse 204 is oriented with its roofline 280 aligned along a North-South (N-S) line. In embodiments where the photovoltaic cells 220 are made using, for example, amorphous silicon it is possible to align the cells 220 of the greenhouse 204 in this manner. Amorphous silicon solar cells do not require the solar cells to be aligned towards true south (if you are in the northern hemisphere), or true north (if you are in the southern hemisphere) to perform in an efficient manner. By aligning the roofline along the N-S line, ground locations below the photovoltaic cells 220 will be heated to different temperatures during the course of the day based on the amount of solar energy received and the infrared transmissivity properties of the cells 220. In some embodiments, lateral air flows are generated in the greenhouse 204 as a result of the migration of the sun from East to West. The migration of the sun causes a migration of the heat on the ground, and the migration of the heat induces the lateral air flow.

Figure 3:
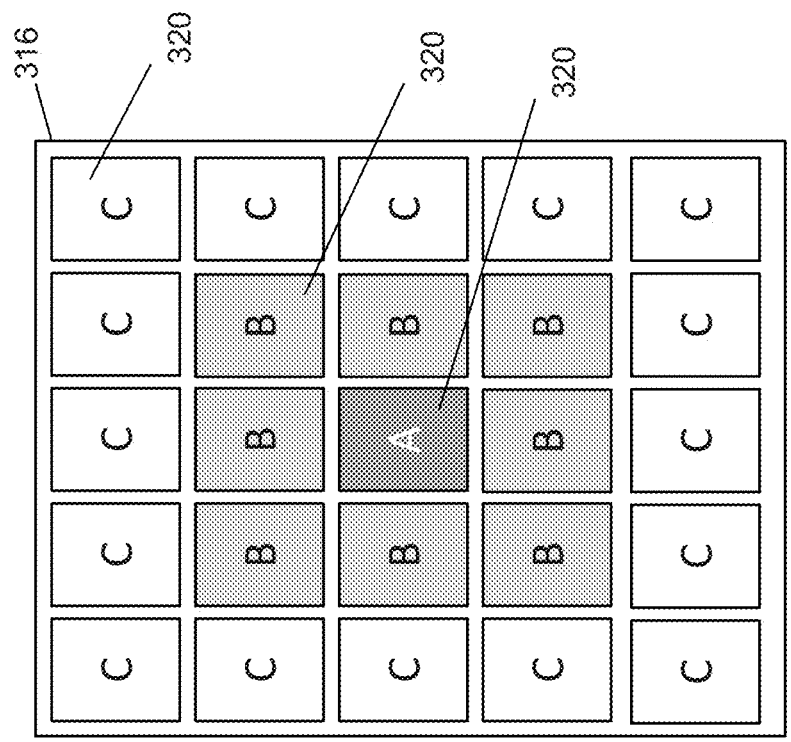
FIG. 3 is a schematic illustration of photovoltaic cells distributed in a roof structure of a greenhouse, according to an illustrative embodiment.

FIG. 3 is a schematic illustration of photovoltaic cells 320 distributed in a roof structure 316 of a greenhouse, according to an illustrative embodiment. In this embodiment, the photovoltaic cells 320 are arranged in a 5×5 grid pattern. In this embodiment, three different types (types A, B, and C) of photovoltaic cells 320 are used. Type A cells 320 allow 50% of the infrared energy to be transmitted through the cells 320. Type B cells 320 allow 5% of the infrared energy to be transmitted through the cells 320. Type C cells 320 allow 25% of the infrared energy to be transmitted through the cells 320. Cells 320 that transmit a larger percentage of infrared energy will heat the ground to higher temperatures than cells 320 that transmit a smaller percentage of infrared energy. In this embodiment, the cells 320 are arranged such that a photovoltaic cell having a relatively high infrared transmissivity property (the A-type photovoltaic cell 320) is surrounded by eight photovoltaic cells each having a relatively low infrared transmissivity property (the B-type photovoltaic cells 320). In addition, the A-type cells and B-type cells are surrounded by sixteen C-type photovoltaic cells. Alternative types of cells can be used in other embodiments. In some embodiments, cells are used that allow different percentages of infrared energy to be transmitted through the cells. For example, two different cells can be used; cells that allow 100% of the infrared energy to be transmitted through the cells and cells that allow 0% of the infrared energy through the cells. In some embodiments, some of the cells in the roof structure are transparent panels, rather than photovoltaic cells.

Figure 4:
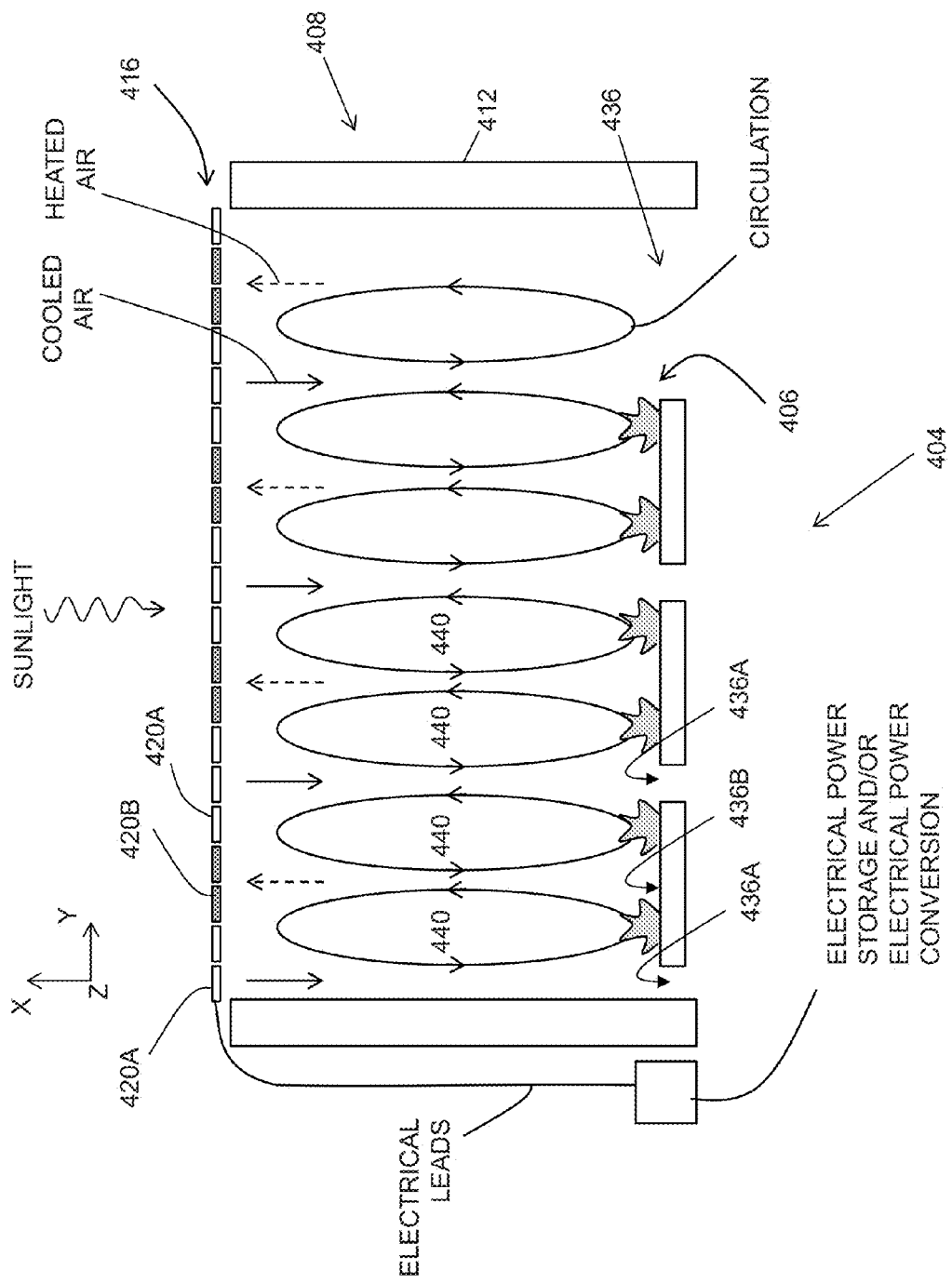
FIG. 4 is a schematic illustration of a photovoltaic greenhouse in which the photovoltaic cells induce a convective air flow in the greenhouse, according to an illustrative embodiment.

FIG. 4 is a schematic illustration of a photovoltaic greenhouse 404 in which the photovoltaic cells 420 in the roof structure 416 induce a convective air flow 440 in the greenhouse, according to an illustrative embodiment. The greenhouse 404 includes a frame structure 408 that include a plurality of walls 412. The greenhouse 404 also includes a roof structure 416 supported by the frame structure 408. The greenhouse 404 includes two different types of photovoltaic cells 420; one type that has relatively low infrared transmissivity properties 420A and a second type that has relatively high infrared transmissivity properties 420B. In one implementation, the photovoltaic cells 420 are arranged in a grid pattern in the roof structure 416 of the greenhouse 404 (e.g., the grid pattern of the greenhouse 203 of FIG. 2).

Photovoltaic cells 420B transmit more infrared energy from the outside of the greenhouse 404 to the inside of the greenhouse 404 than is transmitted by photovoltaic cells 420A. Photovoltaic cells 420B heat the ground 436B (generally 436) beneath the cells to a higher temperature than the photovoltaic cells 420A heat the corresponding ground locations 436A. The heated ground 436B then heats the air in those locations causing the air to rise. A heat gradient is created across the ground by using photovoltaic cells that have different infrared transmissivity properties. Because the air above the ground locations 436B is heated to a different temperature than the air above the ground locations 436A, a circulating air flow is created.

The circulating air is illustrated as having a generally up-and-down circulation path; however, by varying the layout of photovoltaic cells of different infrared transmissivity properties in the roof structure, it is possible to produce air flows that follow a more complex path (for example, flowing in both an up-down path (along the X-axis) as well as a path along the Z-axis). Air flows can be generated that travel along all three axes (X-axis, Y, axis, and Z-axis) by distributing photovoltaic cells of different infrared transmissivity properties in the roof structure. Air flows on the order of 1 km/s can be generated in different embodiments.

The air flows generated distribute carbon dioxide, water vapor, oxygen, pollen and heated air in the greenhouse 404. It is generally undesirable for any one of the substances to build up in a single or small number of locations in the greenhouse. For example, if the substances are not distributed, living organisms are at an increased risk of contracting viruses and plants can be subjected to leaf discoloration. By distributing these substances, it is possible to improve the cultivation of living organisms 406 within the greenhouse 404. For example, the air flows distribute carbon dioxide throughout the greenhouse which helps distribute carbon dioxide to all the plants in a greenhouse. The carbon dioxide is used by the plants in the photosynthesis process by the plants. Distribution of water vapor, oxygen, pollen and heated air in the greenhouse is also important to the health of the living organisms. For example, the air flows cause pollen and carbon dioxide to be more uniformly distributed. When the air flows distribute the pollen, there is an increased probability that pollination of plants or flowers will occur. Distribution of these substances can be varied in different embodiments by taking into account the amount of solar energy in the location during the course of a year as well as the types (e.g., infrared transmissivity properties) of photovoltaic cells used in the greenhouse. Use of the concepts described herein to generate air flows can become even more useful in greenhouse structures that are very tall because stagnant locations are sometimes larger below the roof structure in large buildings.

In addition, by using photovoltaic cells having different infrared transmissivity properties, it is possible to tailor the distribution of heat along the ground 436 in such a manner as to selectively promote growth of different living organisms 406 located on the ground 436. Certain living organisms 406 grow or develop better depending on the amount of infrared energy they receive. For example, it may be desirable to locate organisms 406 that typically thrive in hotter environments in ground locations 436 that allow more infrared energy to be transmitted through the photovoltaic cells 420.

In addition, air flows in the greenhouse 404 can be affected based on the orientation of the greenhouse relative to the track the sun travels relative to the greenhouse 404. For example, if the greenhouse 404 is oriented with its roofline aligned with a North-South line (as with respect to FIG. 2), ground locations below the photovoltaic cells 220 will be heated to different temperatures during the course of the day based on the amount of solar energy received and the infrared transmissivity properties of the cells 220. As the sun travels from East to West during the course of the day, the East-facing photovoltaic cells will be exposed to greater amounts of solar energy in the morning and the West-facing photovoltaic cells will be exposed to greater amounts of solar energy in the afternoon. The different exposure during the course of the day will vary how the ground locations are heated and, as a result will create an additional component of heat gradient that will augment the convective air flow.

Figure 5:
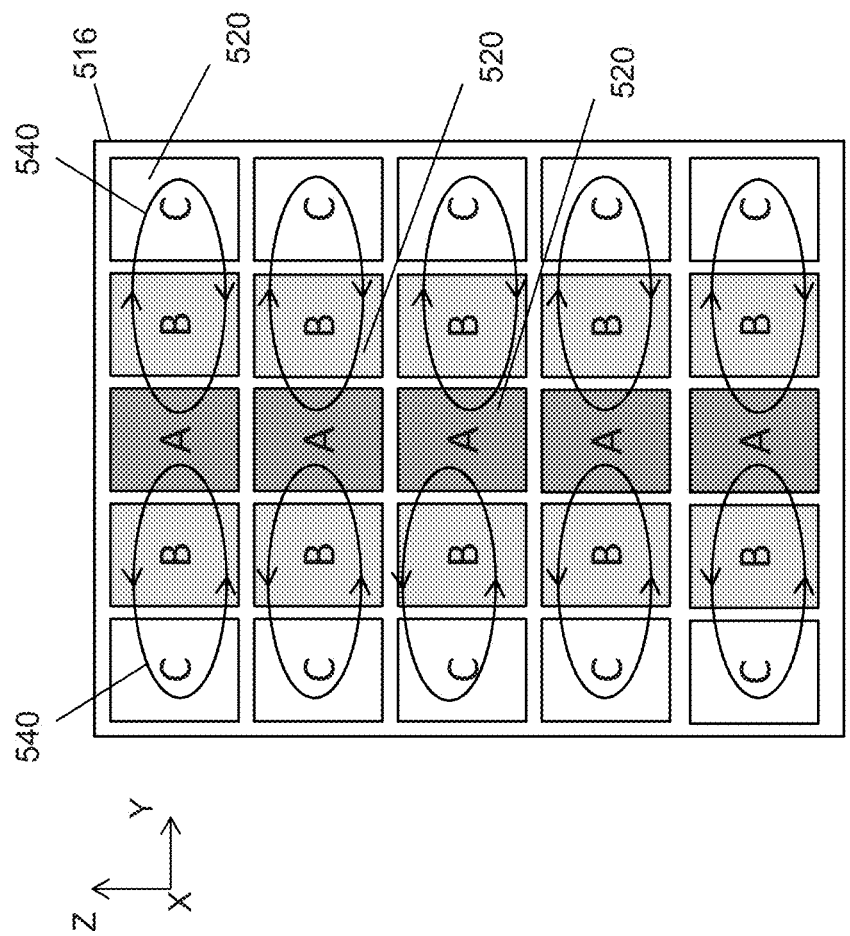
FIG. 5 is a schematic illustration of a photovoltaic greenhouse in which the photovoltaic cells induce a lateral convective air flow in the greenhouse, according to an illustrative embodiment.

FIG. 5 is a schematic illustration of a photovoltaic greenhouse in which the photovoltaic cells induce lateral convective air flows 540 in the greenhouse. The photovoltaic cells 520 are distributed in a roof structure 516 of a greenhouse. In this embodiment, the photovoltaic cells 320 are arranged in a 5×5 grid pattern. In this embodiment, three different types (types A, B, and C) of photovoltaic cells 520 are used. Type A cells 520 allow 50% of the infrared energy to be transmitted through the cells 520. Type B cells 520 allow 5% of the infrared energy to be transmitted through the cells 520. Type C cells 520 allow 25% of the infrared energy to be transmitted through the cells 520. Cells 520 that transmit a larger percentage of infrared energy will heat the ground to higher temperatures than cells 520 that transmit a smaller percentage of infrared energy. In this embodiment, the cells 520 are arranged such that five photovoltaic cells having a relatively high infrared transmissivity property (the A-type photovoltaic cell 520) are in the middle row of the 5×5 grid. A row of B-type cells 520 is provided on the left and right sides of the A-type cells 520. A row of C-type cells 520 are located on the left and right sides of the B-type cells 520. This arrangement induces lateral air flows 540 in the Y-Z plane. The air flows 540 are generated because the infrared energy heats the air to different temperatures and, therefore, different densities. The different densities of air move around and contribute to a lateral convection effect. In some embodiments, the lateral air flows distribute the pollen. Distributing the pollen increases the probability that plants or flowers will pollinate. In some embodiments, a combination of lateral air flows (as illustrated in FIG. 5) and vertical air flows (as illustrated in FIG. 4) will produce air flows along all three axes (X-axis, Y, axis, and Z-axis).

Figure 6:
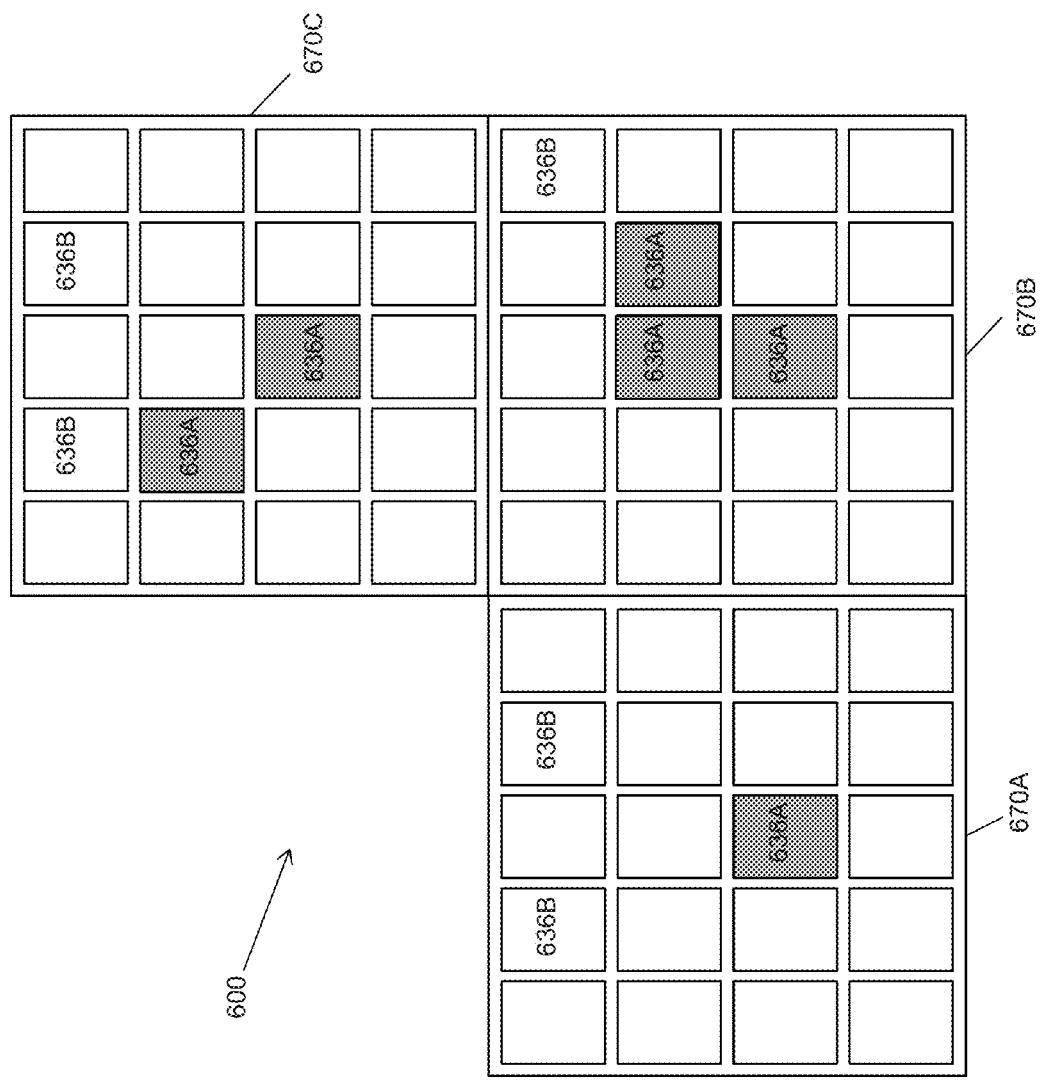
FIG. 6 is a schematic illustration of the heating pattern on ground locations beneath photovoltaic cells of a multi-span structure greenhouse, according to illustrative embodiments.

FIG. 6 is a schematic illustration of the heating pattern on ground locations 636 beneath photovoltaic cells of a multi-span structure greenhouse 600, according to an illustrative embodiment. The greenhouse is configured with three spans 670A, 670B, and 670C in an L-shape. Different configurations can be used in alternative embodiments. Each span produces a different heat pattern. Span 670A has a single photovoltaic cell that heats a ground location 636A (illustrated as a cell that is darker relative to the lower infrared transmissivity cell used in the greenhouse 600) to a higher temperature than the ground locations 636B surrounding it. Span 670B has three photovoltaic cells that heat round locations 636A to a higher temperature that the ground locations 636B surrounding them. The photovoltaic cells in span 670B are arranged in an irregular shape (L-shape in this instance). Span 670C has two photovoltaic cells that heat round locations 636A to a higher temperature that the ground locations 636B surrounding them.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A photovoltaic greenhouse comprising:
a frame structure including a plurality of upstanding walls;
a roof structure supported by the frame structure; and
a plurality of photovoltaic cells installed in the roof structure or walls,
wherein the photovoltaic cells convert solar energy into electricity by absorbing a predefined wavelength band of electromagnetic energy in the solar energy,
wherein the photovoltaic cells have different predefined infrared transmissivity properties to transmit infrared energy through each photovoltaic cell from outside the greenhouse to inside the greenhouse based on the respective photovoltaic cell's predefined infrared transmissivity property,
wherein the photovoltaic cells are distributed in the roof structure or walls in a pattern to heat ground locations within the frame structure to different temperatures in response to the infrared energy transmitted through the photovoltaic cells, and
wherein the photovoltaic cells are distributed such that a photovoltaic cell having a relatively high infrared transmissivity property is surrounded by a plurality of photovoltaic cells each having relatively low infrared transmissivity properties.

2. The greenhouse of claim 1, wherein the pattern to heat ground locations within the frame structure to different temperatures in response to the infrared energy transmitted through the photovoltaic cells induces a convective air flow in the greenhouse.

3. The greenhouse of claim 2, wherein the induced convective air flow distributes carbon dioxide, water vapor, oxygen, pollen, and heated air in the greenhouse.

4. The greenhouse of claim 1, wherein the photovoltaic cells are arranged in a grid pattern in the roof structure, and the ground locations are subjected to amounts of infrared energy passing through the photovoltaic cells based on the infrared transmissivity properties of the photovoltaic cells.

5. The greenhouse of claim 1, wherein the photovoltaic cells have predefined transmissivity properties that allow pre-specified wavelengths of electromagnetic energy to pass through the photovoltaic cells to promote growth of living organisms in the greenhouse.

6. The greenhouse of claim 5, wherein the photovoltaic cells have predefined transmissivity properties that allows prespecified wavelengths of electromagnetic energy to pass through the photovoltaic cells to promote photosynthesis in living organisms in the greenhouse.

7. The greenhouse of claim 1, wherein the greenhouse is a multi-span structure, and each span of the greenhouse has photovoltaic cells having different predefined infrared transmissivity properties.

8. The greenhouse of claim 1, wherein the photovoltaic cells are thin-film photovoltaic cells.

9. A method for generating an air flow in a photovoltaic greenhouse, wherein the greenhouse includes a frame structure including a plurality of upstanding walls, a roof structure supported by the frame structure, and a plurality of photovoltaic cells installed in the roof structure or walls, wherein the photovoltaic cells convert solar energy into electricity by absorbing a predefined wavelength band of electromagnetic energy in the solar energy, the method comprising:

receiving solar energy at the photovoltaic cells;

filtering the solar energy with the photovoltaic cells based on predefined infrared transmissivity properties of the photovoltaic cells, wherein the photovoltaic cells have different predefined infrared transmissivity properties;

transmitting infrared energy through each photovoltaic cell from outside the greenhouse to inside the greenhouse based on the respective photovoltaic cell's predefined infrared transmissivity property;

heating ground locations within the frame structure to different temperatures in response to the infrared energy transmitted through the photovoltaic cells; and wherein a photovoltaic cell having a relatively high infrared transmissivity property is surrounded by a plurality of photovoltaic cells each having relatively low infrared transmissivity properties.

10. The method of claim 9, comprising distributing the photovoltaic cells of different predefined infrared transmissivity in the roof structure or walls in a pattern to heat the ground locations within the frame structure to different temperatures.

11. The method of claim 10, comprising inducing a convective air flow in the greenhouse by distributing the photovoltaic cells of different predefined infrared transmissivity in the roof structure or walls in a predefined pattern.

12. The method of claim of claim 11, wherein the induced convective air flow distributes carbon dioxide, water vapor, oxygen and heated air in the greenhouse.

13. The method of claim 10, wherein the photovoltaic cells are arranged in a grid pattern in the roof structure, and the ground locations are subjected to amounts of infrared energy passing through the photovoltaic cells based on the infrared transmissivity properties of the photovoltaic cells.

14. The method of claim 9, wherein the photovoltaic cells have predefined transmissivity properties that allow prespecified wavelengths of electromagnetic energy to pass through the photovoltaic cells to promote growth of living organisms in the greenhouse.

15. The method of claim 14, wherein the photovoltaic cells have predefined transmissivity properties that allow prespecified wavelengths of electromagnetic energy to pass through the photovoltaic cells to promote photosynthesis in living organisms in the greenhouse.

16. The method of claim 9, comprising orienting the greenhouse such that a roof line of the greenhouse is oriented in a global north-south position.

* * * * *